(12) United States Patent
Herrwerth et al.

(10) Patent No.: US 8,172,936 B2
(45) Date of Patent: May 8, 2012

(54) HYDROPHOBIZING CONSTRUCTION ELEMENTS COMPRISING MINERAL FIBERS

(75) Inventors: Sascha Herrwerth, Essen (DE); Frank Koenig, Gelsenkirchen (DE); Michael Ferenz, Essen (DE); Christian Mund, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 471 days.

(21) Appl. No.: 12/535,756

(22) Filed: Aug. 5, 2009

(65) Prior Publication Data

US 2010/0031852 A1   Feb. 11, 2010

(30) Foreign Application Priority Data

Aug. 5, 2008   (DE) .......................... 10 2008 040 986

(51) Int. Cl.
*C04B 14/04*   (2006.01)
*B32B 9/00*   (2006.01)
*B32B 25/20*   (2006.01)

(52) U.S. Cl. ........................................ 106/481; 428/391
(58) Field of Classification Search .................. 106/481; 428/391, 446; 521/68
See application file for complete search history.

(56) References Cited

U.S. PATENT DOCUMENTS

| | | |
|---|---|---|
| 7,361,777 B2 | 4/2008 | Herrwerth et al. |
| 7,442,666 B2 | 10/2008 | Herrwerth et al. |
| 2005/0136269 A1 | 6/2005 | Doehler et al. |
| 2006/0155090 A1 | 7/2006 | Ferenz |
| 2007/0059539 A1 | 3/2007 | Doehler et al. |
| 2007/0184006 A1 | 8/2007 | Ferenz et al. |
| 2007/0299231 A1 | 12/2007 | Doehler et al. |
| 2008/0187702 A1 | 8/2008 | Ferenz et al. |
| 2008/0216708 A1 | 9/2008 | Herrwerth et al. |
| 2009/0043001 A1 | 2/2009 | Bruckner et al. |
| 2009/0054521 A1 | 2/2009 | Herrwerth et al. |
| 2009/0093598 A1 | 4/2009 | Venzmer et al. |
| 2010/0056649 A1 | 3/2010 | Henning et al. |

*Primary Examiner* — Anthony J Green
*Assistant Examiner* — Pegah Parvini
(74) *Attorney, Agent, or Firm* — Frommer Lawrence & Haug LLP

(57) ABSTRACT

Water repellents based on reactive siloxanes with polyfunctional silylalkoxy modification of the siloxane backbone and processes for hydrophobizing mineral fiber components.

12 Claims, No Drawings

HYDROPHOBIZING CONSTRUCTION ELEMENTS COMPRISING MINERAL FIBERS

This application claims benefit under 35 U.S.C. 119(a) of German patent application 10 2008 040986.3, filed on 5 Aug. 2008.

Any foregoing applications including German patent application DE 10 2008 040 986.3, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Construction elements comprising mineral fibers, such as boards, shells or shaped articles, are inexpensive products. Thus, mineral fiber insulation boards are the most important insulation materials in the construction sector. Particularly in interior finishing, mineral fiber boards are used for heat, cold and sound insulation. Furthermore, mineral fiber components are used in the area of fire protection.

Mineral fiber components are produced from mineral fibers, if appropriate with addition of various additives, such as, for example, fillers and binders.

Glass wool consists, for example, of 60% of waste glass. The remaining constituents are composed of the materials customary in the glass industry, such as quartz sand, soda, dolomite and limestone. Rock wool consists of the natural rocks basalt and diabase, partly supplemented by dolomite and limestone.

These raw materials are of mineral origin and have also been long available. In a first production stage, the raw materials are melted and the resulting 0.1 to 20 µm thick fibers are further processed by drawing, blowing or spinning to give webs, sheets or felts. In general phenol-formaldehyde resins are added as binders (proportion about 7%). Oils and further additives in a proportion of 1% improve the water repellency.

For the production of fiber boards, in general a fiber web is formed from a fiber suspension consisting of mineral fibers, filler and binder on a continuously revolving screen belt and is then dewatered on a dewatering zone. The fiber web is then passed through a drying zone. Thereafter, shaping, pressing, dewatering and possibly application of a pattern or ornament to the surface thereof are effected. Finally, thermal drying is as a rule effected.

By the use of certain additives, the properties of mineral fiber boards can be influenced in a targeted manner. Thus, for example, the patent DE-B-2732387 discloses mineral fiber boards which are produced by impregnation of a mineral fiber board prebound by an organic plastic binder with an aqueous slurry of a binding clay and subsequent consolidation by heating. EP-A-0006362 (U.S. Pat. No. 4,248,664) discloses boards which contain inorganic fibers for reinforcement.

Further typical additives or loading materials are alumina, clay, $ZrO_2$, $TiO_2$, organic fibers or organically finely divided substances as burn-out substances, surfactants and other auxiliaries.

EP-A-0347810 (U.S. Pat. No. 5,071,511) describes mineral fiber boards and methods for the production thereof, suitable binders, preferably starch, likewise being used. One such uncoated mineral fiber board contains 55 to 75% by weight of mineral fibers, 15 to 25% by weight of mineral fillers and 6 to 14% by weight of a starch-based binder. Boards which contain starch as a binder have as a rule insufficient stability to moisture owing to the material properties of starch.

As a result of the absorption of moisture, mineral fibers can become hydrated and then begin to lose their fiber shape so that their mechanical properties change fundamentally. This is as a rule undesired.

In addition, the absorption of moisture is not desirable if mineral fiber boards are used as ceiling panels in interior rooms. Ceiling panels are as a rule fixed only at the edges by suspension. The absorption of moisture leads to an increase in the weight of the panel. The result of this may be that said panel becomes deformed or sags. In the case of fiber boards which are used for heat insulation, moisture absorption leads to a substantial deterioration in the insulating effect.

Weathering, fungal attack or spot formation are further possible, as a rule undesired consequences of too high a water absorption.

In addition to the water-repellent properties, however, other properties can also be influenced in a targeted manner by addition of water repellents, such as, for example, the flexibility, the organophilicity or the increase in volume of loose, unbound mineral wool.

There are various approaches for improving the moisture stability of components comprising mineral fibers. Thus, DE-A-19813848 discloses a process for the production of moisture-stabilised mineral fiber boards or coating materials for raw mineral fiber boards, characterized in that reactants which react with the starch-based binder at temperatures of 110 to 175° C. in the course of the drying to give a moisture-stabilised product are added to the mineral fiber web or to the coating material.

In practice, unreactive silicone oils or emulsions thereof are also added during the production of the mineral fiber components in order to improve the moisture stability of the mineral fiber boards. A disadvantage of this method is that the water repellency of the components is not permanent. Furthermore, the addition of unreactive silicone oils leads to the so-called debonding effect. This describes the decrease in the strength of the component owing to poorer adhesion of the fibers to one another. This is presumably due to the fact that the silicone oil acts as a sort of lubricant between the individual fibers. A further disadvantage of this method is that the addition of silicone oil makes the subsequent overcoating of the component more difficult since disturbances of the finish or paint coat occur to a more pronounced extent.

As a result of the use of branched or linear siloxanes whose polymer chains are terminated with alkoxy functions, some of these disadvantages can be eliminated. Presumably, the polymer chains are fixed on the fiber by condensation reactions. However, the rate of the condensation is comparatively low. This means in practice that the belt speed for the production of the mineral fiber components has to be reduced in order to achieve sufficient fixing of the siloxanes.

A further method for hydrophobizing mineral fiber components consists of the addition of alkoxy-functional silanes, for example octyltriethoxysilane. However, this method is scarcely used in practice since firstly commercially available silanes are comparatively expensive and furthermore sufficient hydrophobization is observed only when high concentrations are used. On application of alkoxy-functional silanes, large amounts of alcohols, in particular ethanol, form, relative to the concentration used and the comparatively small molecular size. As a result of this, large amounts of flammable substances are liberated on drying, which also constitutes a safety-relevant problem.

In the gypsum industry, SiH-functional siloxanes are used for hydrophobizing components. However, such compounds are not used in the hydrophobizing of mineral fibers since large amounts of hydrogen are liberated during the hydrophobization, which in turn constitutes a safety-relevant problem. Moreover, the SiH-functional siloxanes used here are relatively expensive.

The object according to the invention therefore consists in providing novel water repellents for mineral fiber-based components, which water repellents lead to improved water repellency and overcome the disadvantages of the water repellents known from the prior art.

Surprisingly, it was found that the moisture absorptivity of mineral fiber components can be permanently and also very effectively reduced by adding reactive siloxanes of the general formula (I) during the production of the mineral fiber component.

These siloxanes according to the invention are distinguished in that polyfunctional silylalkoxy modifications are present on the siloxane backbone. This polysubstitution leads to a substantial improvement in the water repellency in comparison with the use of reactive siloxanes according to the prior art.

$$M_a M'_b D_c D'_d D^{alkoxy}_e T_f Q_g \quad (I)$$

in which
$M=(R^1_3 SiO_{1/2})$, $M'=(R^1_2 R^2 SiO_{1/2})$,
$D=(R^1_2 SiO_{2/2})$, $D'=(R^1 R^3 SiO_{2/2})$, $D^{alkoxy}=(R^1 R^4 SiO_{2/2})$,
$T=(R^1 SiO_{3/2})$, $Q=(SiO_{4/2})$ and
a=0-22, preferably 0-10, in particular 0-2
b=0-22, preferably 0-10, in particular 0-2
c=5-400, preferably 10-200, in particular 15-150
d=0-20, preferably 0-10, in particular 0
e=0-40, preferably 0-30, in particular 0-20
f=0-10, preferably 0-4, in particular 0
g=0-10, preferably 0-4, in particular 0
a+b is greater than or equal to 2
b+e is greater than or equal to 2
$R^1$=identical or different, aliphatic or aromatic hydrocarbon radicals which optionally have ether functions and/or ester functions and optionally carry halogen atoms, preferably identical or different, aliphatic or aromatic hydrocarbon radicals having 1 to 20 carbon atoms, in particular methyl, phenyl,
$R^2$=identical or different radicals from the group: $R^3$, $R^4$, where e is less than or equal to 1, $R^2=R^4$
$R^3$=identical or different polyether radicals or H, preferably identical or different polyether radicals of the general formula (II) or H,

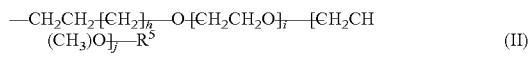
$$\quad (II)$$

in which
h=0-10, preferably 0-4, in particular 1,
i=0-60, preferably 0-40, in particular 0-20,
j=0-60, preferably 0-40, in particular 0-20, with the proviso that i+j is greater than or equal to 3,
$R^5$=identical or different radicals from the group: alkyl, aryl, H or $—C(O)R^6$, in particular H, methyl, ethyl, phenyl or acetyl,
$R^6$=identical or different alkyl or aryl radicals, preferably methyl, ethyl, propyl, butyl or phenyl, in particular methyl or ethyl, and $R^4$=identical or different radicals of the general formula (III)

$$\quad (III)$$

k=2-12, preferably 2-3, in particular 2,
l=0 to less than or equal to 2, preferably 0-1, in particular 0.

Siloxanes generally have a certain molecular weight distribution. Depending on the method of preparation of the underlying siloxane skeleton, the modified units may be present in random distribution over the siloxane main chain but may also occur in blocks. The functionality of the individual polymer molecules is also subject to a distribution. The indices a, b, c, d, e, f and g of the siloxanes used in this invention are therefore mean values. The units characterized by the indices a, b, c, d, e, f and g may be present in random distribution or arranged in blocks or in any other desired sequence in the compounds of the formula (I).

The reactive group $R^4$ is present on average at least twice per siloxane chain. This function can be bound to the siloxane chain, for example, by means of hydrosilylation of alkoxy-functional vinylsilanes with SiH-functional siloxanes, for example by hydrosilylation of vinyltriethoxysilane.

By the incorporation of the group $R^3$, a polyether, the hydrophilicity of the product can be adjusted in a targeted manner, for example in order to make the product easy to formulate. Various polyethers can be used. These are prepared as a rule by an addition reaction of alkoxides with mono- or polyfunctional alcohols or an amine. Owing to their good commercial availability, in particular the following alkoxides are suitable for the synthesis of polyethers: Ethylene oxide, propylene oxide, butylene oxide or styrene oxide.

If different monomers are used for the preparation of the polyethers, for example in order to adjust the hydrophilicity of the product in a targeted manner, the distribution of the monomer units along the polymer mainchain can be controlled by the sequence of metering and by the establishment of various reaction parameters, so that, for example, different monomer units may occur in blocks or may be present in gradual or random distribution. The compounds are present in the form of a mixture with a distribution governed substantially by statistical laws. The values for the indices h, i and j are therefore mean values. The units characterized by the indices h, i and j may be present in random distribution or arranged in blocks or in any other desired sequence in the compounds of the Formula II.

The hydrophobization of the glass fiber components with the siloxanes according to the invention can be effected in any manner known according to the prior art. Thus, for example, it is usual to spray mineral fibers with binder solution via nozzles during their production. The water repellent can be added in pure form, as a solution or as an emulsion to the binder solution or can be applied via a separate spray apparatus. In general, 0.001 to 3% by weight, preferably 0.1 to 1% by weight, particularly preferably 0.2 to 0.4% by weight, of water repellent, based on mineral fiber weight, are used.

Another possible method of application is the admixing of the water repellent with one of the raw materials, for example the starch, the clay or the water. Here too, it is possible to add the siloxanes according to the invention in pure form, as a solution or as an emulsion. Owing to the large number of applications for mineral fiber components, numerous formulations exist. Mineral fiber components typically comprise 30 to 75% by weight of mineral fibers, 20 to 40% by weight of clay and 3 to 4% by weight of starch. Customary further constituents are latex, borax or perlite (up to 40% by weight) and further loading materials and auxiliaries.

The water repellents according to the invention from the group consisting of the reactive siloxanes have molar masses of 800 to 60 000 g/mol, preferably 1000 to 25 000 g/mol and particularly preferably 5000 to 10 000 g/mol and, owing to the multiplicity of reactive groups per molecule, can form a variety of bonds to the substrate, the mineral fiber building material. The concentration of the alcohols likewise forming is substantially reduced in comparison with, for example, the alkoxysilanes and no longer constitutes a safety or a handling problem.

EXAMPLES

Various examples of the production of mineral fiber components according to the invention are described below, which examples show that the siloxanes according to the invention effectively reduce the water absorptivity of these components. These examples are only by way of example and do not limit the scope according to the invention.

1) Preparation of Siloxanes According to the Invention:

The preparation of four different siloxanes according to the invention or the emulsions thereof (OMS 1 to 4) is described below:

a) Preparation of OMS 1:

190 g of vinyltriethoxysilane were additionally introduced into a 1 l three-necked flask having a KPG stirrer, jacketed coil condenser and drop in funnel and heated to 100° C. Thereafter, 15 ppm of Pt in the form of the Karstedt catalyst were added and 500 g of an SiH-functional siloxane of the general formula $(Me_3SiO_{1/2})_2(SiMe_2O_{2/2})_{78}(SiMeHO_{2/2})_{10}$ were slowly metered in. The metering rate was chosen so that the reaction temperature did not exceed 110° C. After metering was complete, the reaction mixture was stirred for a further five hours at 100° C. The volatile fractions were then removed in an oil pump vacuum at 130° C. on a rotary evaporator.

b) Preparation of OMS 2:

66 g of vinyltriethoxysilane were additionally introduced into a 1 l three-necked flask having a KPG stirrer, jacketed coil condenser and drop in funnel and heated to 100° C. Thereafter, 15 ppm of Pt in the form of the Karstedt catalyst were added and 507 g of an SiH-functional siloxane of the general formula $(HMe_2SiO_{1/2})_2(SiMe_2O_{2/2})_{200}(SiMeHO_{2/2})_6$ were slowly metered in. The metering rate was chosen so that the reaction temperature did not exceed 110° C. After metering was complete, the reaction mixture was stirred for a further three hours at 100° C. The volatile fractions were then removed in an oil pump vacuum at 130° C. on a rotary evaporator.

c) Preparation of OMS 3:

118 g of vinyltriethoxysilane and 18 g of 1-octene were additionally introduced into a 1 l three-necked flask having a KPG stirrer, jacketed coil condenser and drop in funnel and heated to 100° C. Thereafter, 15 ppm of Pt in the form of the Karstedt catalyst were added and 405 g of an SiH-functional siloxane of the general formula $(Me_3SiO_{1/2})_2(SiMe_2O_{2/2})_{78}(SiMeHO_{2/2})_{10}$ were slowly metered in. The metering rate was chosen so that the reaction temperature did not exceed 110° C. After metering was complete, the reaction mixture was stirred for a further three hours at 100° C. The volatile fractions were then removed in an oil pump vacuum at 130° C. on a rotary evaporator.

d) Preparation of OMS 4:

87 g of vinyltriethoxysilane and 163 g of an allylpolyether of the general Formula $CH_2=CHCH_2-[CH_2CH_2O]_4[CH_2CH(Me)O]_{20}Me$ were initially introduced into a 1 l three-necked flask having a KPG stirrer, jacketed coil condenser and drop in funnel and heated to 100° C. Thereafter, 15 ppm of Pt in the form of Karstedt catalyst were added and 405 g of an SiH-functional siloxane of the general Formula $(Me_3SiO_{1/2})_2(SiMe_2O_{2/2})_{78}(SiMeHO_{2/2})_{10}$ were slowly metered in. The metering rate was chosen so that the reaction temperature did not exceed 110° C. After metering was complete, the reaction mixture was stirred for a further three hours at 100° C. The volatile fractions were then removed in an oil pump vacuum at 130° C. on a rotary evaporator.

2) Preparation of Aqueous Emulsions of the Siloxanes According to the Invention

For the preparation of an aqueous emulsion of the active substances, 50 g of an emulsifier mixture consisting of an ethoxylated triglyceride having an HLB value (hydrophilic-lipophilic-balance value, describes the hydrophilic and lipophilic fraction of mainly non-ionic surfactants and was proposed in 1954 by W. C. Griffin) of 18 and an ethoxylated fatty alcohol having an HLB value of 11 in the mass ratio of 6:4 were dissolved in 450 g of water while stirring with a turbine. The corresponding organo modified siloxane compound from examples 1a), 1b), 1c) or 1d) was added to such a solution. In each case sufficient organo modified siloxane compound was added so that a mixture which comprises 50% by mass of siloxane compound was obtained. The mixtures obtained were stirred for 30 minutes at 2000 rpm and processed by means of an emulsifying machine (gap homogenizer) to give a stable emulsion.

3) Production of Mineral Fiber Components According to the Invention

For testing the performance characteristics of the compounds according to the invention, a number of mineral fiber boards was produced (cf. Table 1). These were produced firstly without the addition of a water repellent (example 1), with addition of the products OMS 1, OMS 2, OMS 3 and OMS 4 according to the invention (examples 2 to 5) and with addition of water repellents according to the prior art (examples 6 and 7).

TABLE 1

Mineral fiber boards produced

| Mineral fiber board | Added water repellent |
|---|---|
| Example 1 (blank value) | None |
| Example 2 (according to the invention) | OMS 1 emulsion |
| Example 3 (according to the invention) | OMS 2 emulsion |
| Example 4 (according to the invention) | OMS 3 emulsion |
| Example 5 (according to the invention) | OMS 4 emulsion |
| Example 6 (not according to the invention) | SITREN ® 595 |
| Example 7 (not according to the invention) | SITREN ® 245 |

The water repellents according to the prior art are commercially available products of Evonik Goldschmidt GmbH (Essen, Germany). SITREN® 595 is an amino functional siloxane and SITREN® 245 is an alkoxy-functional siloxane not according to the invention (SITREN® is a trademark of Evonik Goldschmidt GmbH).

The formulation for the production of the mineral fiber boards is shown in Table 2:

TABLE 2

Formulation for the production of the mineral fiber boards

| Item | Raw material | m | V | w * |
|------|--------------|---|---|-----|
| 1 | Rock wool | 120 g | | 54% |
| 2 | Clay (white-grey) | 96.0 g | | 43% |
| 3 | Starch | 7.25 g | | 3% |
| 4 | Water | | 1.7 l | |
| 5 | Flocculent (PRAESTOL 2440, Ashland) | | 0.1 l | |

* w = mass fraction of total solids weighed in.

The production of the mineral fiber boards was effected as follows:

First, the water (item 4) was additionally taken in a 10 l bucket and stirred using a paint stirrer (stirring speed 700 rpm, dispersing disc ø125×20 mm). The rock wool (item 1) was then stirred in. In the production of examples 2 to 7, in each case 0.89 g of the water repellent shown in Table 1 was then added (0.4% by weight, based on the sum of items 1 to 3). Stirring was effected for at least one minute. Thereafter, the clay (item 2) and the starch (item 3) were stirred in, mixing was effected for five minutes and finally the flocculent (item 5) was added. The "slurry" must flocculate after addition of item 5. The mixture was filtered over a Schwarzband filter using a commercially available suction filter with the use of a water-jet vacuum. During the filtration with suction, the filter cake was pressed with a glass stopper. Thereafter, the filtration with suction was continued for 30 minutes and the mineral fiber board obtained was dried at 170° C. in a circulation drying oven for 1.5 h.

4) Testing of the Performance Characteristics of the Examples

For testing the performance characteristics of the examples, the water absorption was determined by storing the plates produced for 24 hours in a water bath of 2 cm water above said boards. Table 3 shows the results. The increase in mass is stated relative to the increase in mass of the blank value (water absorption of the blank value=100%).

TABLE 3

Results of testing of the performance characteristics

| Product | Water absorption in relation to the untreated board (blank value) % |
|---------|---|
| Example 1 (blank value) | 100% |
| Example 2 | +++ |
| Example 3 | ++ |
| Example 4 | ++ |
| Example 5 | + |
| Standard SITREN 595 (amino functional siloxane, not according to the invention) | -- |
| Standard SITREN 245, (alkoxyfunctional siloxane, not according to the invention) | 0 |

Legend:
+++ = very low water absorption, very good water repellency
++ = low water absorption, good water repellency
+ = low water absorption, water repellency better than examples of the state of the art
0 = high water absorption, water repellency analogous to the state of the art
-- = very high water absorption, only poor water repellency.

The results show, with the use of the siloxanes according to the invention, the water absorption of the mineral fiber components is substantially reduced than with the use of water repellents according to the prior art.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A process for hydrophobizing mineral fiber components, characterized in that, in the production of the mineral fiber components, siloxanes of the general Formula (I) are added $$M_a M'_b D_c D'_d D^{alkoxy}_e T_f Q_g \qquad (I)$$

in which
$M=(R^1_3 SiO_{1/2})$,
$M'=(R^1_2 R^2 SiO_{1/2})$
$D=(R^1_2 SiO_{2/2})$,
$D'=(R^1 R^3 SiO_{2/2})$,
$D^{alkoxy}=(R^1 R^4 SiO_{2/2})$,
$T=(R^1 SiO_{3/2})$,
$Q=(SiO_{4/2})$
a=0-22,
b=0-22,
c=5-400,
d=0-20,
e=0-40,
f=0-10,
g=0-10,
with the proviso that a+b is greater than or equal to 2 and b+e is greater than or equal to 2,
$R^1$=identical or different, aliphatic or aromatic hydrocarbon radicals which optionally have ether functions and/or ester functions and optionally carry halogen atoms,
$R^2$=identical or different radicals from the group $R^3$, $R^4$, for e less than or equal to 1, $R^2$=$R^4$,
$R^3$=identical or different polyether radicals or H,
$R^4$=identical or different radicals of the general Formula (III)

$$-(CH_2)_k-Si(R^6)_l(OR^6)_{3-l} \qquad (III)$$

k=2-12,
l=0-2,
$R^6$=identical or different alkyl or aryl radicals.

2. The process according to claim 1, in which
a=0-10, b=0-10, c=10-200, d=0-10, e=0-30, f=0-4, g=0-4.

3. The process according to claim 1, in which
a=0-2, b=0-2, c=15-150, d=0, e=0-20, f=0, g=0.

4. The process according to claim 1, in which
R$^1$=identical or different, aliphatic or aromatic hydrocarbon radicals having 1 to 20 carbon atoms or H.

5. The process according to claim 4, in which R$^1$=methyl, phenyl or H.

6. The process according to claim 1, in which
R$^3$=identical or different polyether radicals of the general Formula (II) or H,

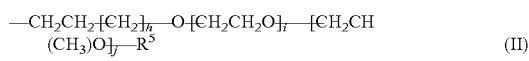
(II)

h=0-10, i=0-60, j=0-60 and i+j is greater than or equal to 3, and
R$^5$=corresponds to identical or different radicals from the group consisting of alkyl, aryl, H or —C(O)R$^6$.

7. The process according to claim 6, in which
h=1, i=0-40, j=0-40, i+j is greater than or equal to 3 and R$^5$=H, methyl, ethyl, phenyl or acetyl.

8. The process according to claim 1, in which
k=2-3, l=0-1 and R$^6$=methyl, ethyl, propyl, butyl or phenyl.

9. The process according to claim 1, in which
k=2, l=0 and R$^6$=methyl or ethyl.

10. The process according to claim 1, characterized in that the water repellent of the Formula (I) is added in pure form, as a solution or as an emulsion to the binder solution or is applied via a separate spray apparatus.

11. Hydrophobized mineral fibers, produced by one of the processes according to claim 1.

12. Hydrophobized mineral fiber components according to claim 11, comprising
30-75% by weight of mineral fibers,
20-40% by weight of clay and
3-4% by weight of starch and
optionally, fiber component constituents, loading materials and auxiliaries.

* * * * *